March 16, 1971     H. C. VIDAL     3,570,253
CONSTRUCTIONAL WORKS

Original Filed March 26, 1964     2 Sheets-Sheet 1

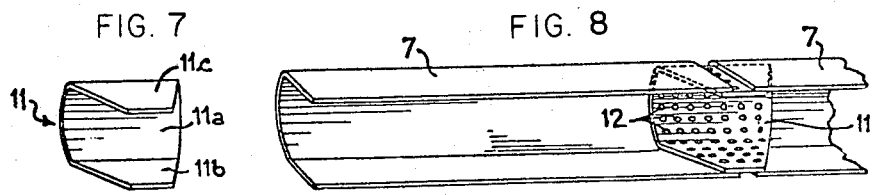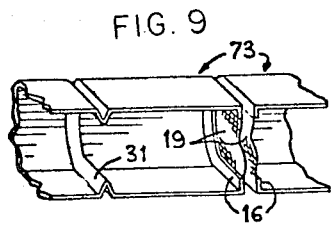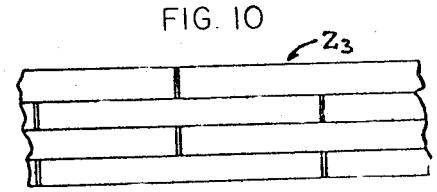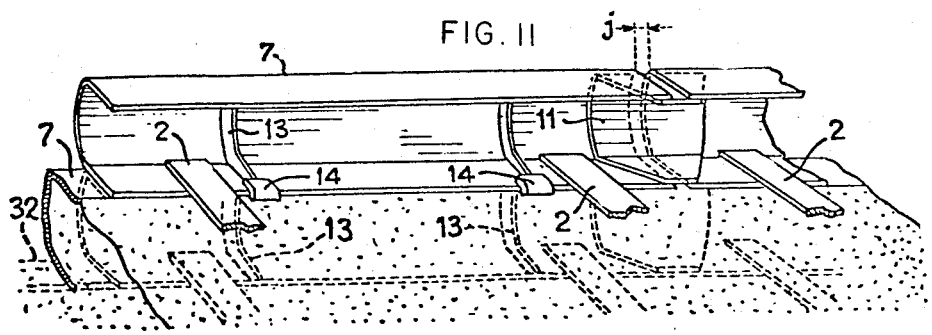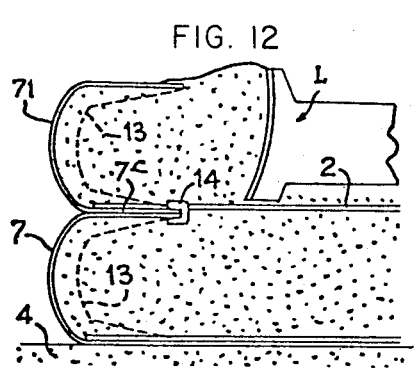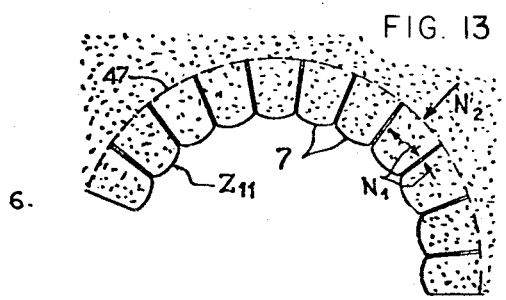

United States Patent Office 3,570,253
Patented Mar. 16, 1971

3,570,253
CONSTRUCTIONAL WORKS
Henri C. Vidal, 17 Rue Armengaud,
92 St. Cloud, France
Original application Mar. 26, 1964, Ser. No. 354,947, now Patent No. 3,421,326, dated Jan. 14, 1969. Divided and this application Jan. 13, 1969, Ser. No. 798,245
Int. Cl. E02b 7/06
U.S. Cl. 61—35
10 Claims

ABSTRACT OF THE DISCLOSURE

Cladding for a mass of particles that are bound together solely by friction. The cladding is preferably in the shape of elongated channel members which have opposed side walls and a curved front wall. The curvature of the front wall is semi-elliptical. The side walls of adjacent channel members are superimposed on each other and the particles and channel members are retained by friction.

RELATED APPLICATION

This is a division of my copending application entitled Constructional Works, Ser. No. 354,947, filed Mar. 26, 1964, which issued Jan. 14, 1969, No. 3,421,326.

BACKGROUND OF THE DISCLOSURE

The first works constructed by man borrowed their essential materials from nature, mainly from the soil. Thus, among the oldest known structures, ditches, embankments, canals, huts, etc., were made of earth. Even at the present day, in some regions cob work is used for the construction of buildings, that is to say a mixture of clay and straw and hay.

During the course of the centuries, scientific progress has led to a reduction in the use of earth as a constructional material. Thus, reinforced concrete, although it uses constituents taken from the ground, the aggregates—in most cases after treatment (crushing, screening, washing, etc.)—requires the use of two constituents of essentially industrial origin: steel for the reinforcements and cement for the bond between aggregates and reinforcements.

It is only in the course of the last few days that due to the general introduction of earthmoving machines and the development of soil mechanics, many extremely technical works have been constructed under economical conditions from earth: dikes, roads, airfield runways, dams, etc.

The present invention proposes providing a new use of earth as a constructional material. It relates more particularly to a constructional work characterised in that it comprises mainly granular elements and reinforcements arranged in such a manner that these elements are maintained relatively to one another either by direct friction with the reinforcements or by friction with other elements in contact with the reinforcements, the assembly thus forming a volume which has cohesion and good resistance.

By "granular elements" there should be understood natural or artificial particles, and the term "reinforcement" is used to mean elements of considerable length which are resistant to tractive forces, such as those used in reinforced concrete and in reinforced plastics.

SUMMARY OF THE INVENTION

Whereas in a mass of non-coherent earth, the only equilibrium factor is due to the effect of the internal friction of the particles in a work according to the invention the friction between particles and reinforcements is an additional stability factor which, combined with the friction of the particles with one another, makes it possible to obtain equilibrium-state contours or stable volumes which would be impossible if the reinforcements were not present. Thus, according to the invention, cohesion is obtained by the association of two types of elements, particles and reinforcements. In the works according to the invention, cohesion therefore has a very different origin from that which characterises masses consisting of concrete whether reinforced or otherwise, where it is due to the rigid connection created by the setting and hardening of the cement, and also different from cob work constructions where the cohesion is created by the adhesive action of the clay.

In the works according to the invention, the reinforcements make their action felt on a certain zone which surrounds them, but it will be apparent that even if the reinforcements are extended to the free surface of the work, this action, which generates cohesion, is less effective on the free surface where the pressure of the particles tends to push these out of the mass, so that in most cases it is necessary to provide on the free surface of a work according to the invention a means for retaining the particles which are situated on the surface or in the vicinity of the surface.

In many cases, this means is constituted by a kind of cladding distinct from the particles and the reinforcements; it will be referred to hereinafter as the "skin." This skin can be constructed in various forms. One possible form of embodiment is constituted by U-shaped elements whose limbs serve both to anchor them in the mass of particles and to allow them to be juxtaposed with one another. This skin does not properly speaking play any part in the stability of the work, being merely intended to contain the particles arranged near the free surfaces of the work. Therefore, it must be capable of resisting the local stresses whilst being capable of flexibility which enables it to adapt itself to possible deformations.

To simplify, the association of particles and reinforcements which is the basic feature of works constructed according to the present invention will be referred to as "reinforced earth."

Such works may be of many different kinds and can have all kinds of forms. However, the main field of use for such reinforced earth concerns heavy works, that is to say those whose free surface in relation to the total volume of the work is relatively small. This means that the works according to the invention will be mainly dikes, foundation masses, dams, coffer-dams, tunnels, etc., although lighter works such as pillars, beams and arches are not excluded.

The works constructed according to the present invention afford many advantages.

They are economical and easy to put into use since one of their constituents, earth, can be in most cases found on the building site itself and put into position with the usual site machinery, whilst the light elements, reinforcements and skin, can be handled either by hand or with small lifting machines.

Works made of reinforced earth, whilst enjoying the benefits of the strength required for maintaining them, do not have the rigidity of works made of concrete or reinforced concrete, so that they can adapt themselves to deformations, either normal or accidental deformations, of the medium with which they are in contact. More particularly, they are capable of resisting when the foundation soil is poor.

Calculating reinforced earth works is relatively simple and is based more especially on the methods involved in the strength of materials, soil mechanics and the mechanics of reinforced concrete. The fact that the reinforced earth constructional elements are generally elastic contributes to easy calculation. Furthermore, it is easy to construct small-scale models in reinforced earth to confirm or establish more exactly the results of the calculations.

Work made of reinforced earth can easily be demolished, and when this is necessary it is easy to recover the more expensive elements, the reinforcements and skin. This is an obvious advantage in the case of temporary works. For permanent works, this advantage is not as paradoxical as it appears; in fact, the acceleration of technical progress often has result of making obsolete works which have been designed to "last forever."

The features and advantages of the invention will become more apparent during the following description.

DESCRIPTION OF THE DRAWINGS

In the accompanying drawings, given merely by way of example:

FIG. 7 is a joint cover used in the assembly shown in FIG. 6;

FIG. 8 shows a variant of the joint cover;

FIG. 9 shows the connection of sections according to another form of embodiment;

FIG. 10 is an elevational view of a facing provided with a skin formed of superposed sections, with staggered joints;

FIG. 11 is a perspective view, partially in cross-section of an installation of skin and particles;

FIG. 12 is a side elevational view of the installation in FIG. 11; and

FIG. 13 is a cross-sectional view of the construction of an arch constructed in accordance with this invention.

DESCRIPTION OF PREFERRED EMBODIMENTS

In most cases, with a volume of reinforced earth of any form, there is provided an independent means for ensuring the cohesion of the particles at the free surface of the reinforced earth work. This means will be referred to as a "skin" in the description which follows.

Generally speaking, the skin is to be sufficiently strong locally to retain the particles of earth which are comprised between two neighbouring reinforcements and which are situated near the surface of the reinforced earth mass.

But it must also be sufficiently flexible in general to follow all deformations of the volume of reinforced earth, integrally therewith, since the earth even though reinforced can be subjected to relatively considerable deformations (particularly compacting). If the face were rigid, it would necessarily be in contact with elements externally of the reinforced earth mass (the supporting soil for example) and would transmit considerable supplementary external forces which may not be properly understood, making the reinforced earth lose completely its character as a uniform constructional material.

Finally, the skin is to have a protective function, resisting impacts and the action of erosion exerted by the external medium, and is to be designed in such a manner that it is extremely easy to put the skin into position as well as the earth and reinforcements.

Figure 1:
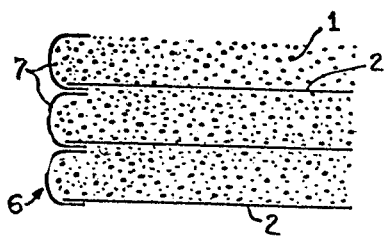
FIG. 1 is a schematic view showing a work confined by a preferred embodiment of skin according to the invention.
Figure 2:
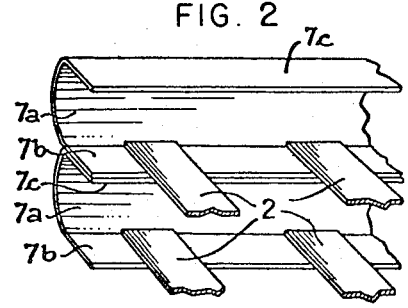
FIG. 2 is a perspective view of the skin in FIG. 1.

A typical example of skin is shown in FIGS. 1 and 2 in the case of a vertical face. According to this form of embodiment, the skin 6 is constituted by a stack of horizontal elements 7 which are of U-shaped cross-section, filled with the particles 1 of the work which are thus contained by the base 7a of the elements. The flat side walls or flanges 7b, 7c of the elements permit the elements to be superposed on one another, anchoring them in the mass of particles and connecting them to the reinforcements 2.

The term "particle" designates any element the form of which approximates to that of a sphere, that is to say which does not have any major dimension. The particles used in the works according to the invention are in most cases taken from all kinds of soil encountered in nature. Although, in the foregoing, reference has been made implicitely to particles taken from soils of the "pulverulent" type, that is to say not having any natural cohesion, it will be apparent that the term "particle" covers agglomerates formed of "coherent" earth.

Furthermore, if the term "earth" is used as synonymous with "particles," it should be understood that does not exclude particles which do not originate from the ground, being for example manufactured industrially with any desired materials and in all kinds of forms.

The grain size of the particles may be optional (powders, sands, gravels, stones, rough stone etc.) provided that the maximum size of the particles is compatible with the strength of the reinforcements and the skin used in the work being constructed. Thus, the work consisting of rough stone could in certain cases require the use of reinforcements and skin of a thickness which would make its price prohibitive.

Figure 3:
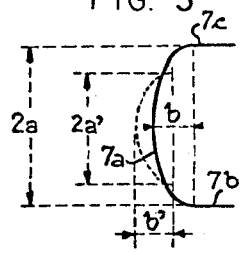
FIG. 3 is a diagrammatic sectional view showing a cross-section of the skin element of FIG. 1.

The cylindrical skin elements of FIGS. 1 and 2 comprise a base 7a which, as FIG. 3 shows, is approximately in the form of a semi-ellipse with two semi-axes $a$, $b$. Calculation shows that under the action of the pressure of the particles contained in the elements and the internal friction angle of which is designated by $\varphi$, the elliptical profile remains such if $a$ and $b$ are connected by the equation:

$$a = b\sqrt{i}$$

where $i$ is the co-efficient of pressure, equal to:

$$tg^2\left(\frac{\pi}{4} - \frac{\varphi}{2}\right)$$

Figure 4:
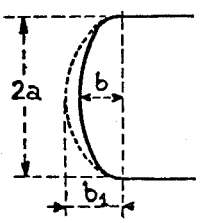
FIG. 4 is a diagrammatic sectional view as in FIG. 3.

The substantially elliptical form of the cross-section is maintained in a homothetic manner after the packing of the earth in a direction perpendicular to the anchoring planes 7b, 7c as shown in FIG. 3 (where $b' = a'\sqrt{i}$) provided that the properties of the earth do not vary. If the properties of the earth vary, the co-efficient of pressure passing from $i$ to $i_1$, the ratio of the axes of the ellipse also varies as FIG. 4 shows where $b_1 = a\sqrt{i_1}$. In all cases, the envelope remains perfectly stable provided that the mechanical properties of the material constituting it permit of such deformations without risk of fracture. Calculation carried out by conventional methods enables suitable choice of skin properties to be made which will guarantee this stability.

The skin elements 7 are normally constituted by section members of specific length (5 metres for example) which are assembled together end to end in any desired number to match the dimensions of the work being constructed.

Figure 5:
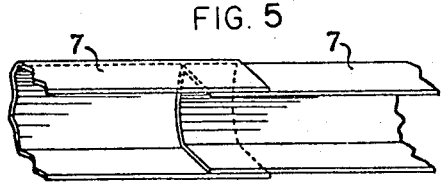
FIG. 5 is a perspective view of a joint for assembling sections of a skin element.

In FIG. 5, the joint between two adjacent section members is obtained by simple overlapping.

Figure 6:
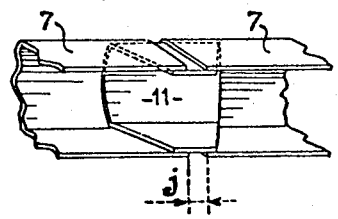
FIG. 6 is a perspective view of a modified joint assembly including a joint cover.

In the example shown in FIGS. 6 and 7, the adjacent ends of two sections members to be connected together are separated by a clearance $j$ which enables longitudinal displacements of the elements and within the end zones of the section members there is inserted a joint cover 11 whose cross-section matches that of the section members. The flanges 11b, 11c of this joint cover are given, in the example illustrated, the form of a trapezium the small base of which coincides with the edge of the flange. Thus, the base 11a of this joint cover has with regard to the adjacent section members a large amount of overlap by means of which the pressure of the particles tends to clamp against the joint cover in a sealing-tight manner against the section members.

This sealing-tightness is ensured both with respect to earth and with respect to water, unless it is desired to provide between the section members "draining joints" in which case joint covers provided with perforations 12 will be used such as that illustrated in FIG. 8. Such perforations can also be provided in the section members themselves.

In FIG. 9, the connection between two adjacent section members 73 is obtained without any joint covers. The ribs or bent-over edges 16 are simply approached towards one another and a diaphragm 19 is provided which is glued to each rib 16 and covers the entire end cross-section.

Under the pressure of the earth, these two diaphragms are applied against one another in an almost sealing-tight manner. In order to allow considerable longitudinal movements, each section member 73 can be provided with one or more transverse folds 31 forming a kind of expansion bellows.

Instead of diaphragms 19, it would also be possible to connect the edges 16 by any desired means, for example bolts.

Two section members such as 73 could also be connected to one another by fitting the bent-over edge 16 of one of the section members in an end groove of the other section member, similar to the fold 31.

The skin elements which have just been described by way of example are constructed from any desired materials enabling the conditions of strength and flexibility already indicated to be satisfied. The materials suitable for the production of the reinforcements are particularly suitable for producing the skin elements. Typical materials which could be quoted are epoxy or polyester resin laminates or wires of glass fibre, mild steel, rustless steel, and copper. Various plastic materials other than those which have just been mentioned may also be used.

In FIG. 10 there has been shown by way of example a work $Z_3$ which is seen in elevation and the skin of which is formed of several rows of section members similar to those which have just been described and the joints of which are staggered. These joints could also be arranged in vertical alignment with one another.

Instead of having a smooth surface, two adjacent section members could be corrugated tarnsversely, so as to be capable of being connected to one another by overlapping their corrugations in their end zones.

The skin elements or section members 7 and 73 have been assumed to be rectilinear in their general direction. But it will be apparent that they could be curved, giving them the form of a segment of a torus whose axis is perpendicular to the anchoring planes or parallel thereto. Multiple curvatures could be provided. It would also be possible to provide elements the height of which, measured between anchoring planes, is variable.

It will be noted that the anchoring planes of the skin elements described hereinbefore have a similar function, with respect to the particles of earth, to that of the reinforcements. In certain works, examples of which will be given hereinafter, this particular function of the skin elements makes it possible to dispense with incorporating independent reinforcements.

In order to construct a work of the type shown in FIG. 1, there are placed on a roughly levelled strip 32 of the foundation soil a first row of skin elements 7 (FIGS. 11 and 12) having ribs 13 and corresponding joint covers 11, and then the first bed of reinforcements 2 are positioned. The skin elements being suitably anchored in the soil, the earth is put in place until the level of the upper anchoring plane is reached, this earth being normally extracted from the terrain constituting the foundation soil. This building-up of soil is generally effected with the aid of a bulldozer, a loader or a similar machine. The shield L of the bulldozer introduces the earth within the skin element, compressing it more or less strongly as desired. This operation is carried out without causing any damage to the skin element, owing to the rigidity provided by the ribs 13.

For the upper rows of skin elements, section members 71 are used which comprise not only ribs 13 but also connecting ribs 14 (FIGS. 11 and 12).

The first row being already laid and filled with earth, the operations of laying the second row are as follows:

Cleaning-away the earth remaining on the upper anchoring planes 7c of the first row;

Positioning side by side the section members 71 of the second row, leaving the necessary joint width j for the longitudinal deformation which may occur, and arranging the ribs 13 of the two rows in vertical alignment with one another;

Positioning the joint covers;

Positioning reinforcements;

Putting the earth in position, this being effected as indicated hereinbefore.

When the bulldozer pushes the earth within the skin element, the said element is to be anchored to the subadjacent skin elements, so as to prevent any slipping or knocking over. This anchoring is effected by means of hooks 14 which are engaged on the face of the subjacent anchoring plane 7c, level with the two reinforcing ribs 13 (FIG. 11). The hooks 14, may, if appropriate, be replaced by bolts or any other connecting means.

The bulldozer used for putting the earth in position has a compacting effect on the earth at the same time. In exceptional cases, the compacting can be improved by means of long vibrating pins or, better still, rammers similar to those used in foundries.

A certain number of skin unit elements and a certain number of reinforcements can be assembled in advance before the earth is put in position. They may be assembled in their final position or at a distance therefrom. In both cases, but more especially in the event of transport being necessary, it may be necessary to consolidate the assembly with bolts, cables, struts, which have a part to play only during transport or the positioning of the earth. The connection between two prefabricated assemblies is effected by means of the joint covers of the skin elements.

The earth is put in position either hydraulically with suction dredgers which are very economical earth moving machines, or by simply discharging the earth in position free lorries, mechanical shovels, drag lines, etc.

If filling is effected with sand, this sand can also be transported by means of pipes through which air flows at a high speed. In certain cases, it is possible to arrange within the skin elements tubular envelopes made of a cheap material (canvas tubes for example) and these envelopes can be filled by air, water or any other means, the filled envelopes holding the skin elements during operations.

The advantage of prefabricated assemblies is particularly great in the case of works which are to be carried out under water; the prefabricated assemblies are positioned side by side and, where appropriate, one above the other; the only work to be executed on the actual site is the positioning of the joint covers, which can be carried out either very rapidly under dry conditions, in the case of a sea work uncovered at low tide, or under water by using skin diving apparatus.

Among arches which can be constructed from reinforced earth, there may be mentioned conventional arch bridges, viaducts, underground passages and tunnels in loose ground and more particularly all kinds of passages which have to be formed below motorway embankments.

Vaults are very easy to construct in reinforced earth, and it is often possible to construct them in the manner shown in the case of the small vault $Z_{11}$ of FIG. 13, using only skin elements the anchoring planes of which act as reinforcements. Under these conditions, it is sufficient to arrange all the skin elements in an arc of a circle on two circular templates and then to fill all of them with earth.

The volume of reinforced earth is bounded by the visible intrados and by the cylinder having as its directrix the line 47 joining the ends of the anchoring planes. The arc corresponding to this volume is to be in equilibrium due to the effect of external actions. It is calculated in conventional manner. It has simply to be verified that this arc, considered as an assembly of independent archstones, is in equilibrium. Furthermore, between the main stress in the earth parallel to the intrados $N_1$ and the perpendicular stress $N_2$, it must be true that $N_2 \leqslant iN_1$.

In the example of an arch of three meters in diameter subjected to a constant pressure from 10 metres of earth and for which the anchoring planes have a width of about 0.50 m., the stress $N_2$ is equal to $1.8 \times 10 = 18$ T./m.$^2$, and the stress $N_1$ has the value:

$$\frac{N_2 R}{e} = \frac{N_2 \times 1.5}{0.5} = 3N_2$$

and we have in fact $N_2 \leqslant 0.33 N_1$.

Of course, the examples which have just been given are not intended to be limitative in any way, and it is possible to use reinforced earth to construct works, parts of works, constructional elements, etc. of forms different from those which have been described here. Thus, it is possible to construct by methods of the present invention volumes which comprise curved portions or reentrants.

What is claimed is:

1. Constructional work comprising:
   a mass of pulverulent, discrete particles, said particles being normally capable of lateral slippage relative to one another; and
   cladding means for supporting and retaining said particles, said cladding means including a plurality of elongated channel members each having a longitudinal axis and a channel-shaped cross section defined by opposed longitudinally extending side walls and a front wall extending between said side walls, said side walls of adjacent channel members being in direct engagement with each other,
   said particles being confined within said channel members, and said front walls of said channel members defining a surface of said work, said cladding means being so arranged that said channel members are substantially free to undergo a deformation in a direction transverse to said longitudinal axes, whereby said cladding is resiliently yieldable in the direction transverse to said longitudinal axes.

2. The constructional work according to claim 1 wherein said surface of said work is curved about an axis extending longitudinally of said channel members.

3. The constructional work according to claim 2 wherein said channel members are arranged in an arch.

4. The constructional work according to claim 1 wherein said front wall of at least one of said channel members is in the shape of a semi ellipse, said semi-ellipse having a major axis extending between said side walls, said front wall being curved outwardly.

5. The constructional work according to claim 4 wherein said semi-ellipse has a minor axis and the length of one-half said minor axis is substantially equal to one-half the length of the major axis multiplied by the square root of the coefficient of pressure of said particles.

6. The constructional work according to claim 4 wherein said side walls are substantially flat.

7. Cladding for retaining a mass of pulverulent discrete particles, said cladding comprising a plurality of elongated channel members, each of said channel members having a longitudinal axis and a channel-shaped cross-section defined by opposed longitudinally extending side walls and a front wall extending between said side walls, said front wall of at least one of said channel members being curved outwardly, said cladding means being so arranged that said channel members are substantially free to undergo a deformation in a direction transverse to said longitudinal axes, whereby said cladding is resiliently yieldable in the direction transverse to said longitudinal axes.

8. The cladding according to claim 7 including joint means connecting adjacent ends of said channel members.

9. The cladding according to claim 7 wherein said front wall is in the shape of a semi-ellipse, the major axis of said semi-ellipse extending between said side walls.

10. The cladding according to claim 7 wherein said side walls are substantially flat and said longitudinal axes of said channel members are arranged in substantially parallel relation with said side walls of adjacent members being in superimposed direct engagement with each other.

References Cited

UNITED STATES PATENTS

| | | | |
|---|---|---|---|
| 776,799 | 12/1904 | Reed | 61—30 |
| 832,371 | 10/1906 | Friestedt | 61—2 |
| 1,762,343 | 6/1930 | Munster | 61—39 |
| 1,951,292 | 3/1934 | Cahill | 61—34X |
| 1,968,993 | 8/1934 | Cox | 61—35 |
| 2,056,349 | 10/1936 | Evers | 61—39 |
| 2,138,037 | 11/1938 | Lane | 61—35 |
| 2,145,396 | 1/1939 | Kato | 61—30 |
| 2,184,462 | 12/1939 | Milliken | 61—39X |
| 2,193,425 | 3/1940 | Lake | 61—35X |
| 2,261,715 | 11/1941 | Clark | 61—35 |
| 2,405,289 | 8/1946 | Cardwell | 61—39 |

DAVID J. WILLIAMOWSKY, Primary Examiner

P. C. KANNAN, Assistant Examiner

U.S. Cl. X.R.

61—39